(12) United States Patent
Choi et al.

(10) Patent No.: US 11,509,504 B2
(45) Date of Patent: Nov. 22, 2022

(54) ELECTRONIC DEVICE FOR PERFORMING POSITIONING AND CONTROL METHOD OF ELECTRONIC DEVICE

(71) Applicant: Samsung Electronics Co., Ltd., Suwon-si (KR)

(72) Inventors: Sehwan Choi, Suwon-si (KR); Jungsik Park, Suwon-si (KR); Jaeyoung Shin, Suwon-si (KR); Woosup Lee, Suwon-si (KR); Dohun Cha, Suwon-si (KR); Sunyoung Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,196

(22) PCT Filed: Dec. 6, 2018

(86) PCT No.: PCT/KR2018/015415
§ 371 (c)(1),
(2) Date: Jun. 8, 2020

(87) PCT Pub. No.: WO2019/112335
PCT Pub. Date: Jun. 13, 2019

(65) Prior Publication Data
US 2021/0105169 A1  Apr. 8, 2021

(30) Foreign Application Priority Data

Dec. 7, 2017 (KR) .......................... 10-2017-0167234

(51) Int. Cl.
*H04L 67/04* (2022.01)
*H04L 12/66* (2006.01)
(Continued)

(52) U.S. Cl.
CPC .............. *H04L 12/66* (2013.01); *H04L 67/04* (2013.01); *H04L 69/16* (2013.01); *H04W 12/64* (2021.01)

(58) Field of Classification Search
None
See application file for complete search history.

(56) References Cited

U.S. PATENT DOCUMENTS 9,435,877 B2    9/2016  Bottazzi
2007/0053412 A1*  3/2007  Hashimoto .......... H04B 1/7163
                                                       375/130
(Continued)

FOREIGN PATENT DOCUMENTS

JP      2014-227647 A    12/2014
JP      2016-038332 A     3/2016
(Continued)

OTHER PUBLICATIONS

International Search Report and Written Opinion of the International Searching Authority in connection with International Application No. PCT/KR2018/015415 dated Mar. 18, 2019, 15 pages.

(Continued)

*Primary Examiner* — Joshua Joo

(57) ABSTRACT

Disclosed is an electronic device including a communication circuit and a processor. The processor may be configured to communicate with an external electronic device based on a specified protocol, using the communication circuit, to receive first information at least including type information of the external electronic device based on the specified protocol, using the communication circuit, and to determine a positioning master for measuring a distance between the electronic device and the external electronic device based at least on the first information among the electronic device (Continued)

and the external electronic device. Other various embodiments as understood from the specification are also possible.

13 Claims, 11 Drawing Sheets

(51) Int. Cl.
*H04L 69/16* (2022.01)
*H04W 12/64* (2021.01)

(56) References Cited

U.S. PATENT DOCUMENTS

| | | | | |
|---|---|---|---|---|
| 2008/0125040 | A1* | 5/2008 | Kalayjian | H04W 8/005 |
| | | | | 455/41.2 |
| 2010/0304670 | A1* | 12/2010 | Shuo | H04W 4/80 |
| | | | | 455/41.1 |
| 2011/0212733 | A1 | 9/2011 | Edge et al. | |
| 2014/0161046 | A1 | 6/2014 | Edge et al. | |
| 2014/0187159 | A1* | 7/2014 | Hohndel | H04W 8/005 |
| | | | | 455/41.2 |
| 2014/0348327 | A1* | 11/2014 | Linde | H04H 20/88 |
| | | | | 381/2 |
| 2015/0066247 | A1 | 3/2015 | Dale | |
| 2016/0050531 | A1 | 2/2016 | Choi et al. | |
| 2016/0178727 | A1 | 6/2016 | Bottazzi | |
| 2016/0291141 | A1* | 10/2016 | Han | G01S 3/8083 |
| 2017/0303084 | A1 | 10/2017 | Bruckner | |
| 2017/0368411 | A1* | 12/2017 | Komatsu | A63B 43/008 |
| 2019/0097317 | A1* | 3/2019 | Di Nallo | H01Q 13/16 |
| 2019/0135229 | A1* | 5/2019 | Ledvina | H04L 63/18 |
| 2019/0266822 | A1* | 8/2019 | Ruggieri | G07C 9/00571 |
| 2021/0245707 | A1* | 8/2021 | Golsch | B60R 25/24 |

FOREIGN PATENT DOCUMENTS

| | | |
|---|---|---|
| JP | 2017-092533 A | 5/2017 |
| KR | 10-2015-0137947 A | 12/2015 |
| KR | 10-2016-0136131 A | 11/2016 |
| KR | 10-2017-0119650 A | 10/2017 |

OTHER PUBLICATIONS

Supplementary European Search Report dated Dec. 11, 2020 in connection with European Patent Application No. 18 886 354.2, 10 pages.
Korean Intellectual Property Office, "Request for the Submission of an Opinion," dated Oct. 5, 2022, in connection with Korean Patent Application No. 10-2017-0167234, 16 pages.

* cited by examiner

ELECTRONIC DEVICE FOR PERFORMING POSITIONING AND CONTROL METHOD OF ELECTRONIC DEVICE

CROSS-REFERENCE TO RELATED APPLICATIONS

This application is a 371 National Stage of International Application No. PCT/KR2018/015415, filed Dec. 6, 2018, which claims priority to Korean Patent Application No. 10-2017-0167234, filed Dec. 7, 2017, the disclosures of which are herein incorporated by reference in their entirety.

BACKGROUND

1. Field

Embodiments disclosed in this specification relate to an electronic device performing positioning and a control method thereof.

2. Description of Related Art

With the development of the electronic communication industry, a technology for improving user convenience through the interaction between electronic devices has been used widely. For example, when another authenticated electronic device is in an adjacent location, an electronic device may allow access to the other electronic device (or the user thereof). In this case, the user experience and security may be improved by allowing the access only when the two electronic devices are adjacent to each other. For example, positioning between electronic devices may be performed based on a satellite system such as a global positioning system (GPS). However, the accuracy of the satellite system-based positioning is very poor indoors.

SUMMARY

To interact between electronic devices, it is necessary to secure accurate positioning between electronic devices. For example, a smart door lock may be opened and closed depending on whether a user device is adjacent. In this case, security issues may occur due to incorrect positioning. In particular, in the case of an indoor environment including a plurality of interactable electronic devices, there is a need for a more accurate positioning method. Furthermore, a plurality of electronic devices may have different positioning capabilities. Accordingly, there is a need for a method for positioning between electronic devices having different positioning capabilities.

Various embodiments disclosed in the specification provide an electronic device capable of providing more accurate adaptive positioning and a control method thereof.

According to an embodiment disclosed in this specification, an electronic device may include at least one communication circuit, and a processor controlling the at least one communication circuit. The processor may be configured to communicate with an external electronic device based on a specified protocol, using the at least one communication circuit, to receive first information at least including type information of the external electronic device based on the specified protocol, using the at least one communication circuit, and to determine a positioning master for measuring a distance between the electronic device and the external electronic device based at least on the first information among the electronic device and the external electronic device.

Furthermore, according to an embodiment disclosed in this specification, an electronic device may include at least one communication circuit and a processor controlling the at least one communication circuit. The processor may be configured to broadcast information including an identifier of the electronic device, using the at least one communication circuit, to receive a response signal to the broadcasting from an external electronic device, using the at least one communication circuit, to communicate with an external electronic device according to a specified protocol based at least on the response signal, to receive first information at least including type information of the external electronic device according to the specified protocol, using the at least one communication circuit, and to determine a positioning master for measuring a distance between the electronic device and the external electronic device based at least on the first information among the electronic device and the external electronic device.

According to the embodiments disclosed in this specification, a more flexible adjacency-based access may be performed by negotiating a role for positioning.

Moreover, according to various embodiments, accurate positioning may be performed indoors by using positioning based on an ultra-wideband signal.

Besides, a variety of effects directly or indirectly understood through the disclosure may be provided.

BRIEF DESCRIPTION OF THE DRAWINGS

With regard to description of drawings, the same or similar components may be marked by the same or similar reference numerals.

DETAILED DESCRIPTION

Figure 1:
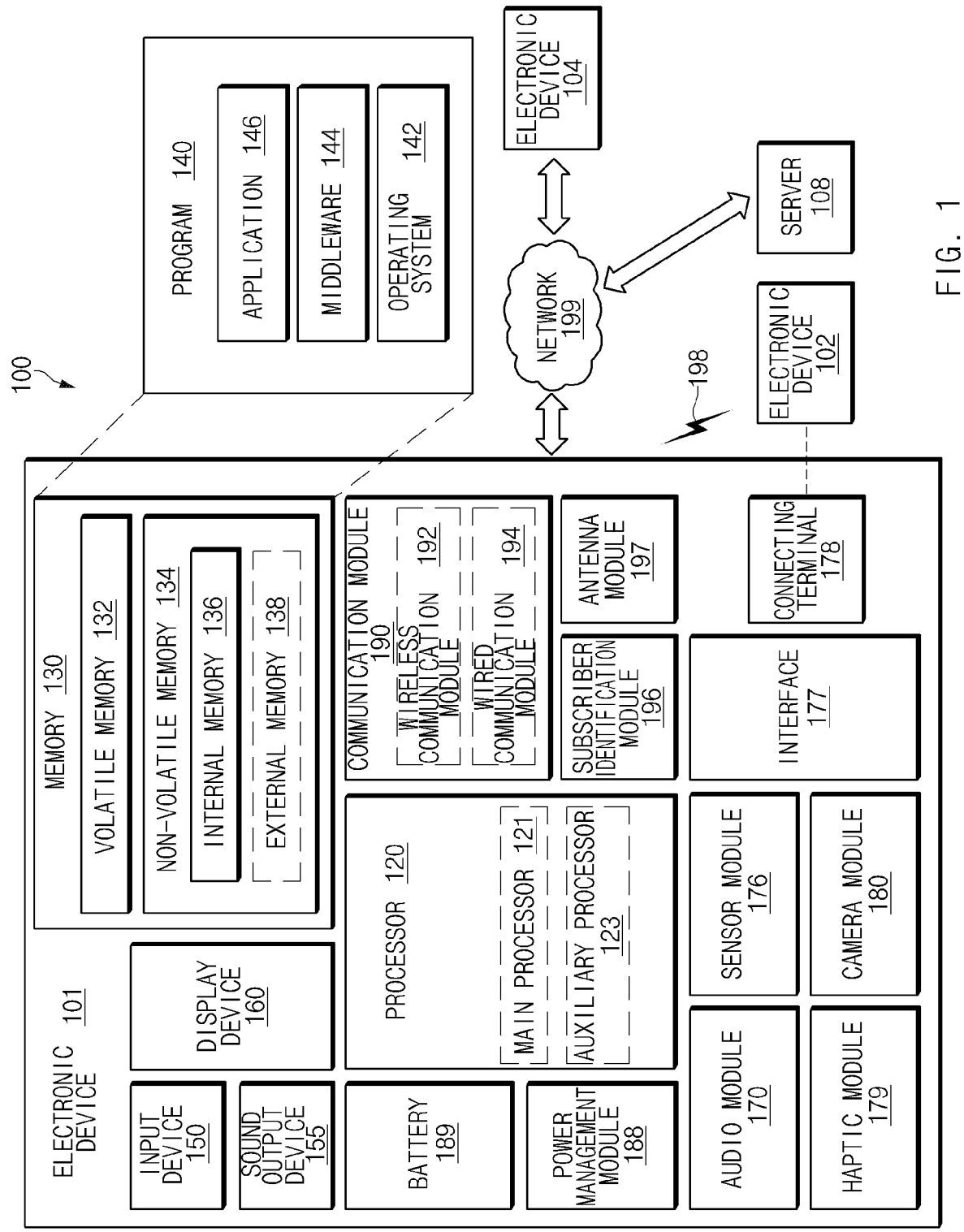
FIG. 1 is a block diagram of an electronic device in a network environment, according to various embodiments.

Hereinafter, various embodiments of this specification may be described with reference to accompanying drawings. Embodiments and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A or/and B", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

In this specification, according to the situation, the expression "configured to" used herein may be interchangeably used as, for example, the expression "suitable for", "having the capacity to", "designed to", "adapted to", "made to", or "capable of". The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

According to various embodiments of this specification, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to an embodiment, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs), points of sales (POSs), or Internet of things (e.g., light bulbs, various sensors, sprinkler devices, fire alarms, thermostats, street lamps, toasters, exercise equipment, hot water tanks, heaters, boilers, and the like). According to another embodiment, the electronic devices may include at least one of parts of furniture, buildings/structures, or vehicles, electronic boards, electronic signature receiving devices, projectors, or various measuring instruments (e.g., water meters, electricity meters, gas meters, or wave meters, and the like). According to various embodiments, an electronic device may be a flexible electronic device or may be a combination of two or more of the above-described devices. An electronic device according to an embodiment of this specification may not be limited to the above-described electronic devices. In this specification, the term "user" used herein may refer to a person who uses an electronic device or may refer to a device (e.g., an artificial intelligence electronic device) that uses an electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, various operations of the electronic device 101 are described. The operations of the electronic device 101 to be described later may be performed by the processor 120 of the electronic device 101. According to an embodiment, the electronic device 101 may include at least one communication circuit (e.g., the communication module 190) and at least one processor (e.g., the processor 120) controlling the at least one communication circuit. For example, the at least one processor may perform signal transmission and reception by controlling at least one communication circuit. For another example, the at least one processor may be controlled based on instructions stored in the memory (e.g., the memory 130) of the electronic device 101. The external electronic device (e.g., the electronic device 102 or the electronic device 104) to be described later may at least partially include a configuration substantially similar to that of the electronic device 101. Hereinafter, the term "positioning" may include the term "measuring" and/or the term "locating". For example, the "positioning" may include measurement of distance and/or direction (e.g., angle of arrival (AoA) and/or angle of departure (AoD)). In the following embodiments, the positioning may be performed by measuring the distance and/or direction. For example, the positioning may be performed based on the calculation of a location. For another example, the calculation of a location may be performed based on the calculation of a distance and/or a direction.

Figure 2:
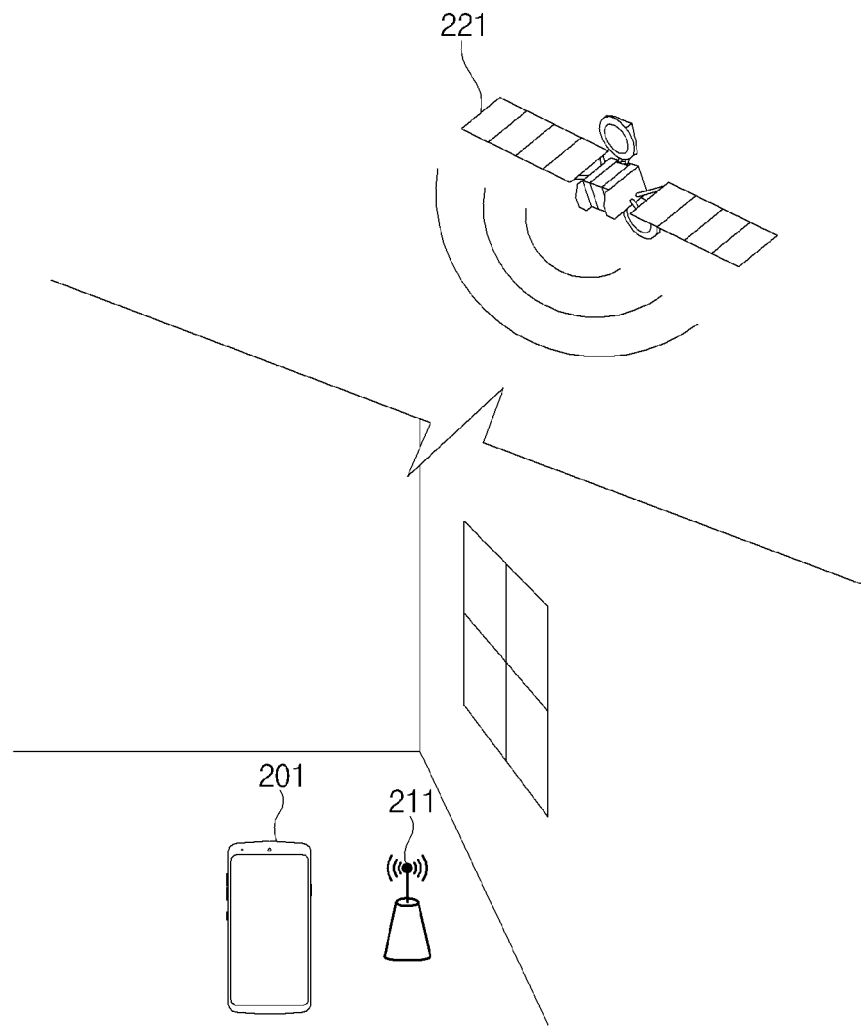
FIG. 2 illustrates a positioning environment according to an embodiment.

FIG. 2 illustrates a positioning environment according to an embodiment.

Referring to FIG. 2, an electronic device 201 (e.g., the electronic device 101 of FIG. 1) may perform positioning, using a signal received from a satellite 221. For example, the electronic device 201 may perform positioning, using GPS. However, as illustrated in FIG. 2, when the electronic device 201 is positioned indoors, GPS-based positioning may be failed.

According to an embodiment, the electronic device 201 may perform positioning through the communication with an external electronic device 211 (e.g., the electronic device 102 or the electronic device 104 of FIG. 1). For example, the electronic device 201 may obtain the absolute location of the electronic device 201, using the absolute location (e.g., latitude and longitude) of the external electronic device 211. For another example, the electronic device 201 may obtain a relative location (e.g., distance and/or direction) with the external electronic device 211.

According to an embodiment, the electronic device 201 may perform positioning through the Bluetooth communication (e.g., Bluetooth low energy (BLE)) with the external electronic device 211. For example, the electronic device 201 may perform positioning using signal characteristics such as signal strength (e.g., received signal strength indication (RSSI)) and/or a phase. The electronic device 201 may measure an angle of arrival (AoA) based at least on the phase difference between signals received through a plurality of antennas. However, because Bluetooth communication-based positioning has a relatively large error (e.g., about 5 m), accurate positioning may not be performed. In addition, because the positioning is performed based on characteristics of a signal, the Bluetooth communication-based positioning is vulnerable to the fading and noise of a signal. Also, because the structure of a device (e.g., the electronic device 201) and a beacon (e.g., the external electronic device 211) are specialized in only a single positioning algorithm, various positioning algorithms may not be performed based on Bluetooth communication.

According to an embodiment, the electronic device 201 may perform positioning through Wi-Fi communication with the external electronic device 211. For example, the electronic device 201 may perform positioning (e.g., distance and/or AoA), using signal characteristics such as the strength and/or phase of a signal. For another example, the electronic device 201 may perform positioning based at least on a time of flight (ToF). The electronic device 201 may measure the ToF based on the transmission time and reception response time of a signal. However, because Wi-Fi communication-based positioning has a relatively large error (e.g., about 5 m), accurate positioning may not be performed. In addition, because the positioning is performed based on characteristics of a narrowband signal, the Wi-Fi communication-based positioning is vulnerable to the fading and noise of a signal. Furthermore, because the structure of a device (e.g., the electronic device 201) and an access point (e.g., the external electronic device 211) are specialized in only a single positioning algorithm, Wi-Fi communication-based positioning may not adaptively use various positioning algorithms. In addition, the Wi-Fi communication has relatively high power consumption.

According to an embodiment, the electronic device 201 may perform positioning based on an ultra-wideband signal. For example, the ultra-wideband signal may have a frequency band of 500 MHz or more. For another example, the ultra-wideband signal may be generated by using a frequency of 500 MHz or higher. For another example, the ultra-wideband signal may be a signal in which the bandwidth of the ultra-wideband signal is not less than about 20% of the center frequency of the ultra-wideband signal. Because the ultra-wideband signal has characteristics similar to those of the impulse signal, the pulse width is shorter than the path delay. Accordingly, in the positioning using an ultra-wideband signal, a direct signal and a reflected signal may be easily classified. The distance between the electronic device 201 and the external electronic device 211 may be measured relatively accurately (e.g., the error of less than 5 cm) based at least on the characteristics of the above-described ultra-wideband signal. Besides, ultra-wideband communication has low power consumption. Accordingly, in the following embodiments, the electronic device 201 may perform positioning based on an ultra-wideband signal.

In general, ultra-wideband signal-based positioning is used for industrial-purpose communication. However, as described below with reference to FIG. 3, the ultra-wideband signal-based positioning may be used in various applications.

Figure 3:
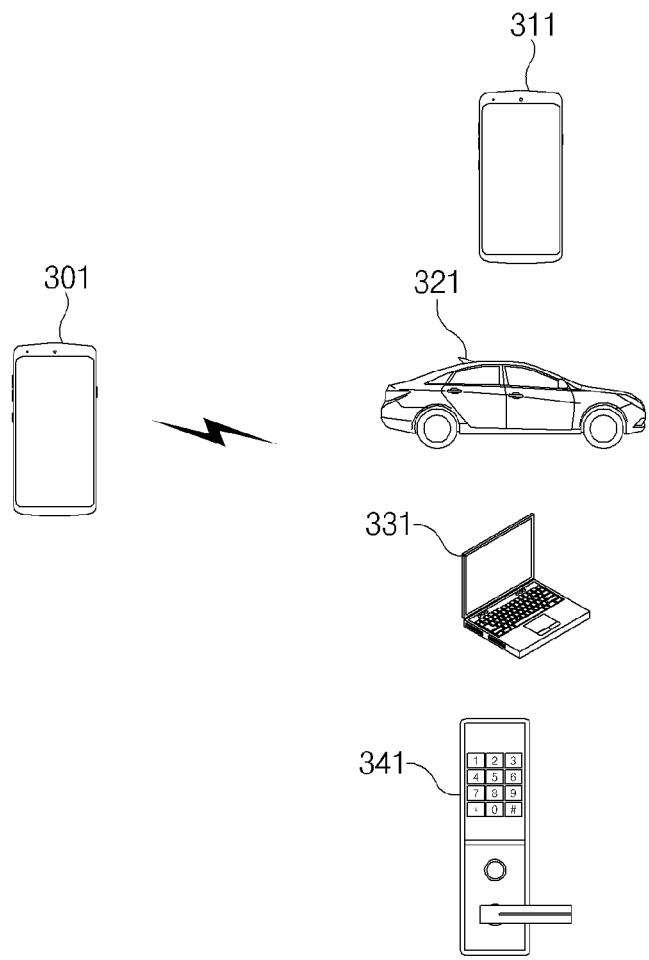
FIG. 3 illustrates examples of an interaction of an electronic device according to various embodiments.

FIG. 3 illustrates examples of an interaction of an electronic device according to various embodiments.

Referring to FIG. 3, an electronic device 301 (e.g., the electronic device 101 in FIG. 1) may perform ultra-wideband signal-based positioning on various external electronic devices 311, 321, 331, and 341. The definition of an ultra-wideband signal is as described above with reference to FIG. 2. In FIG. 3, the electronic device 301 is illustrated as a smartphone, but the electronic device 301 is not limited thereto. The electronic device 301 may be any portable electronic device.

According to an embodiment, the electronic device 301 may interact based on the distance from the external electronic device 311 (e.g., the electronic device 102 or the electronic device 104 in FIG. 1). For example, the electronic device 301 may perform positioning, using an ultra-wideband signal to discover the external electronic device 311. A user of the electronic device 301 may perform the corresponding application in the electronic device 301 to discover the external electronic device 311. For convenience of description, it is assumed that the external electronic device 311 includes a single antenna, but the external electronic device 311 may include a plurality of antennas. Moreover, the electronic device 301 may measure the distance from the external electronic device 311 and/or the direction of the external electronic device 311, based at least on the ultra-wideband signal transmitted from the external electronic device 311.

According to an embodiment, the electronic device 301 may interact based on the distance from the vehicle 321 (e.g., the electronic device 102 or the electronic device 104 in FIG. 1). For example, the electronic device 301 may operate as a key of the vehicle 321. For example, the electronic device 301 may obtain information about the distance between the electronic device 301 and the vehicle 321, using an application operating in the background of the electronic device 301. Because the background application is used, the interaction between the electronic device 301 and the vehicle 321 may be performed without the user's other actions. For example, the vehicle 321 may include a plurality of antennas. The vehicle 321 may perform positioning based on a time difference of arrival (TDoA) of a signal transmitted from the electronic device 301. For example, the signal transmitted from the electronic device 301 may include a time stamp indicating the transmission time. For example, when the location of the electronic device 301 is less than a specified distance and the electronic device 301 is authenticated, the vehicle 321 may open the door of the vehicle 321.

According to an embodiment, the electronic device 301 may interact based on the distance from the laptop 331 (e.g., the electronic device 102 or the electronic device 104 in FIG. 1). For example, when the electronic device 301 is positioned adjacent to the laptop 331, the laptop 331 may be unlocked. For convenience of description, it is assumed that the laptop 331 includes a single antenna, but the laptop 331 may include a plurality of antennas. The laptop 331 may perform positioning based on two way ranging (TWR). For example, the laptop 331 may perform positioning by transmitting a positioning signal including the time stamp to the electronic device 301 and receiving a response signal from the electronic device 301.

According to an embodiment, the electronic device 301 may interact based on the distance from the smart lock 341 (e.g., the electronic device 102 or the electronic device 104 in FIG. 1). For example, the smart lock 341 may measure the distance between the smart lock 341 and the electronic device 301 based on TWR. When a valid key is received from the electronic device 301 and the electronic device 301 is positioned within a specified distance, the smart lock 341 may allow access to the electronic device 301.

The distance-based interaction of the electronic device 301 is not limited to the examples of FIG. 3. For example, the electronic device 301 may perform broadband signal-based positioning to discover a location (e.g., a specific store in a shopping mall or an office in a building) of a specific place in a room.

As described above with reference to FIG. 3, the electronic device 301 may perform positioning for interacting with various external electronic devices. According to an embodiment, the electronic device 301 may operate as a tag for transmitting an ultra-wideband signal for positioning or as an anchor for receiving an ultra-wideband signal. According to another embodiment, the electronic device 301 may operate as a master performing positioning or as a slave of an external electronic device performing positioning. According to another embodiment, the electronic device 301 may perform positioning based on various positioning algorithms (e.g., AoA, TDoA, AoD, time of arrival (ToA), time of flight (ToF), and TWR).

Hereinafter, the interaction between the vehicle 321 and the electronic device 301 according to an example will be described with reference to FIG. 4.

Figure 4:
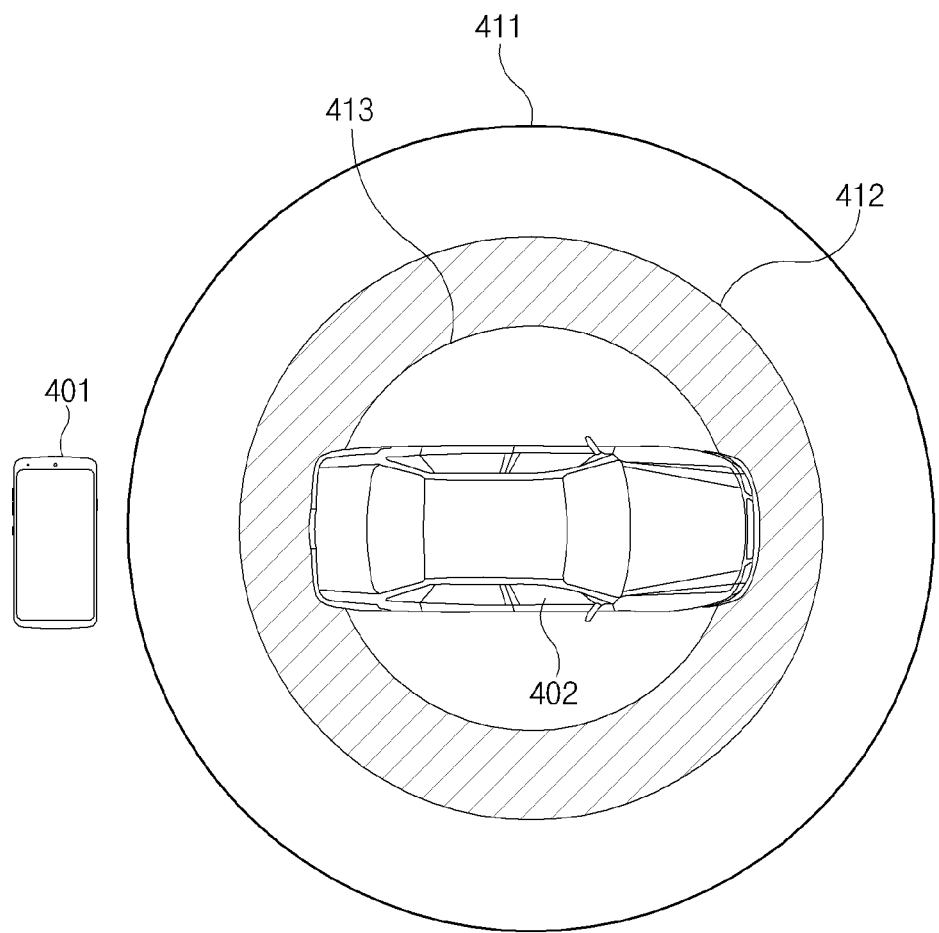
FIG. 4 illustrates proximity degree-based control of an electronic device according to an embodiment.

FIG. 4 illustrates proximity degree-based control of an electronic device according to an embodiment.

Referring to FIG. 4, according to an embodiment, an electronic device 401 (e.g., the electronic device 101 in FIG. 1) may operate as a key of a vehicle 402 (e.g., the electronic device 102 or the electronic device 104 in FIG. 1). In FIG. 4, a first region 411, a second region 412, and a third region 413 are illustrated with the center at the vehicle 402. Although not illustrated in FIG. 4, hereinafter, a region inside the vehicle 402 may be referred to as a "fourth region". In FIG. 4, each region is illustrated as a concentric circle, but the shape of each region is not limited thereto. In the following embodiments, the first region 411 may mean the outermost region, and the second region 412 may mean a region positioned inside the first region 411 and positioned outside the third region 413. Also, the fourth region may mean a region located inside the third region 413.

According to an embodiment, the vehicle 402 may broadcast or advertise information for discovering the electronic device 401, in the range of the first region 411. For example, the vehicle 402 may broadcast or advertise information including the identifier of the vehicle 402 at a specified period. According to another embodiment, the vehicle 402 may broadcast or advertise first information associated with the identification of the vehicle 402 depending on a specified protocol in the range of the first region 411 to discover the electronic device 401. According to still another embodiment, the vehicle 402 may broadcast or advertise information associated with the identification of the electronic device 401 (e.g., the identifier of the electronic device 401) in the range of the first region 411 to discover the electronic device 401. For example, the specified protocol may be one of Bluetooth (e.g., BLE), 3rd generation partnership project (3GPP) communication standard, institute of electrical and electronics engineers (IEEE) 802.15-based communication standard (e.g., ZigBee, ultra wideband (UWB), or the like), or Z-Wave communication standard.

According to an embodiment, the electronic device 401 may receive identification information of the vehicle 402 or identification information of the electronic device 401 and may transmit an acknowledgment thereto to the vehicle 402. For example, as the electronic device 401 enters the first region 411, the electronic device 401 may also receive identification information of the vehicle 402. According to another embodiment, the electronic device 401 may transmit an acknowledgment to the vehicle 402 depending on the specified protocol.

According to an embodiment, the electronic device 401 may establish first wireless communication with the vehicle 402 depending on a specified protocol. For example, the electronic device 401 may transmit and receive at least one signal including various pieces of information for establishing the first wireless communication.

According to an embodiment, the vehicle 402 may transmit a key request for authenticating the electronic device 401 to the electronic device 401. For example, when the acknowledgment is received from the electronic device 401, the vehicle 402 may transmit the key request. For another example, after the establishment of the first wireless communication, the vehicle 402 may transmit the key request. The vehicle 402 may transmit the key request to the electronic device 401 through the first wireless communication.

According to an embodiment, the electronic device 401 may transmit a key for authenticating the electronic device 401 to the vehicle 402 in response to a key request. For example, the electronic device 401 may transmit a key to the vehicle 402 through the first wireless communication. According to an embodiment, the electronic device 401 may transmit the key stored in the security region (e.g., security element (SE) or embedded SE (eSE)) of the electronic device 401 to the vehicle 402. According to an embodiment, when the electronic device 401 is authenticated based on the key received from the electronic device 401, the vehicle 402 may transmit device information including information of the vehicle 402 to the electronic device 401.

According to an embodiment, when the authentication of the electronic device 401 is completed, a procedure for determining a positioning role and/or positioning algorithm between the electronic device 401 and the vehicle 402 may be initiated. For example, the electronic device 401 and the vehicle 402 may perform initialization operations for ultra-wideband communication.

According to an embodiment, the initialization operations for ultra-wideband communication may include master negotiation for determining a master device or a slave device for positioning between the electronic device 401 and the vehicle 402. For example, the positioning master negotiation may include the exchange of positioning capability information between the electronic device 401 and the vehicle 402. For example, the positioning capability information may include information about a related application identifier, a positioning algorithm, a positioning role, a positioning master, a communication module state, and/or the number of antennas.

According to an embodiment, the positioning capability information may be exchanged through a predetermined frame (e.g., pre-symbol frame). For example, the pre-symbol frame may include a structure as illustrated in Table 1 below.

TABLE 1

| Application ID | Positioning algorithm | Role (Anchor/ Tag) | Positioning master | Wireless state | Number of antennas |
| --- | --- | --- | --- | --- | --- |

Referring to Table 1, for example, the application ID may be information for identifying an application of the corresponding electronic device and may be an integer value within a specified range. For example, the positioning algorithm may be information indicating a positioning algorithm capable of being supported by the corresponding electronic device, and may include information indicating TDoA, TWR, ToA, ToF, AoD, and/or AoA. For example, the role may be information indicating a role supported or preferred by the corresponding electronic device, and may indicate a tag transmitting a positioning signal and/or an anchor receiving a positioning signal. For example, the positioning master may include information indicating whether to perform the positioning of the corresponding electronic device. For example, the positioning master may include information indicating that the corresponding electronic device is a master device performing an operation of measuring a distance and/or information indicating that the corresponding electronic device is a slave device providing information for measuring a distance. For example, the radio state may include information indicating whether to support the transmission and/or reception (e.g., the transmission and/or reception of an ultra-wideband signal) of the corresponding electronic device. For example, the number of antennas may include information indicating the number of antennas that the corresponding electronic device has. For example, the number of antennas may be indicated as an integer within a specified range. For another example, antennas, of which the number is not less than the specified number, may be indicated by the same indicator.

According to an embodiment, after the positioning capability information is exchanged, the electronic device 401 or the vehicle 402 may determine the positioning master and/or positioning algorithm. For example, the electronic device 401 may determine the positioning master and/or positioning algorithm based at least on the positioning capability information of the vehicle 402 and may transmit the related information to the vehicle 402. For another example, the vehicle 402 may determine the positioning master and/or positioning algorithm based at least on the positioning capability information of the electronic device 401 and may transmit the related information to the electronic device 401. For example, when the electronic device 401 determines the positioning algorithm, the electronic device 401 may determine the positioning algorithm based on the number of antennas. When the number of antennas is less than the specified number (e.g., 2 or 3), the electronic device 401 may use the TWR method; when the number of antennas is not less than the specified number (e.g., 2 or 3), the electronic device 401 may use the AoA or TDoA method. According to another embodiment, the positioning master and/or positioning algorithm may be implicitly determined depending on a specified condition. For example, the positioning master may be determined depending on the type of application, which is identified by the application identifier. For example, the positioning algorithm may be determined as a positioning algorithm indicated by the positioning master or a positioning algorithm having a higher priority among positioning algorithms indicated by the positioning master.

According to an embodiment, after negotiation of the positioning master and/or positioning algorithm, the electronic device 401 or the vehicle 402 may perform ultra-wideband signal-based positioning. For example, the vehicle 402 may perform positioning, and the electronic device 401 may transmit an ultra-wideband signal for positioning at a specified period. The vehicle 402 may monitor whether the electronic device 401 enters the third region 413, by performing the ultra-wideband signal-based positioning.

According to an embodiment, when the entry of the third region 413 of the electronic device 401 is detected, the vehicle 402 may transmit a key request for authenticating the electronic device 401 to the electronic device 401. For example, the vehicle 402 may transmit the key request to the electronic device 401 through the first wireless communication.

According to an embodiment, the electronic device 401 may transmit a key for authenticating the electronic device 401 to the vehicle 402 in response to a key request. For example, the electronic device 401 may transmit a key to the vehicle 402 through the first wireless communication. According to an embodiment, the electronic device 401 may transmit the key stored in the security region (e.g., SE or eSE) of the electronic device 401 to the vehicle 402. According to an embodiment, the vehicle 402 may perform authentication of the electronic device 401 based on the key received from the electronic device 401. When the electronic device 401 is authenticated, the vehicle 402 may open the door of the vehicle 402.

According to an embodiment, when the electronic device 401 is positioned in the fourth region (e.g., the interior of the vehicle 402), the vehicle 402 may be switched to a start-up ready mode. In the start-up ready mode, a user may start the vehicle 402 through an input to the electronic device 401 or the vehicle 402.

According to an embodiment, when the engine of the vehicle 402 is started, the vehicle 402 may operate in a driving mode. In the driving mode, the vehicle 402 having a relatively large amount of power may perform positioning. For example, even though the electronic device 401 has performed positioning in the third region 413, the vehicle 402 may perform positioning in the driving mode. In addition, in the driving mode, the vehicle 402 may perform positioning on the electronic device 401 using a positioning algorithm different from the positioning algorithm used in the third region 413. For example, the vehicle 402 may detect whether the electronic device 401 is located inside the vehicle 402.

According to an embodiment, when the engine of the vehicle 402 is stopped, the vehicle 402 may be controlled based on the location of the electronic device 401. For example, the positioning may be performed depending on a positioning method (e.g., a positioning master and/or positioning algorithm) performed in a third region. For example, when the electronic device 401 is moved out of the third region 413, the vehicle 402 may lock the door of the vehicle 402.

As described above with reference to FIGS. 3 and 4, various external electronic devices may have various positioning capabilities. Accordingly, there is a need for a method for actively performing positioning based on the positioning capability of an external electronic device. A method for determining a role and/or algorithm for positioning is described with reference to FIG. 5.

Figure 5:
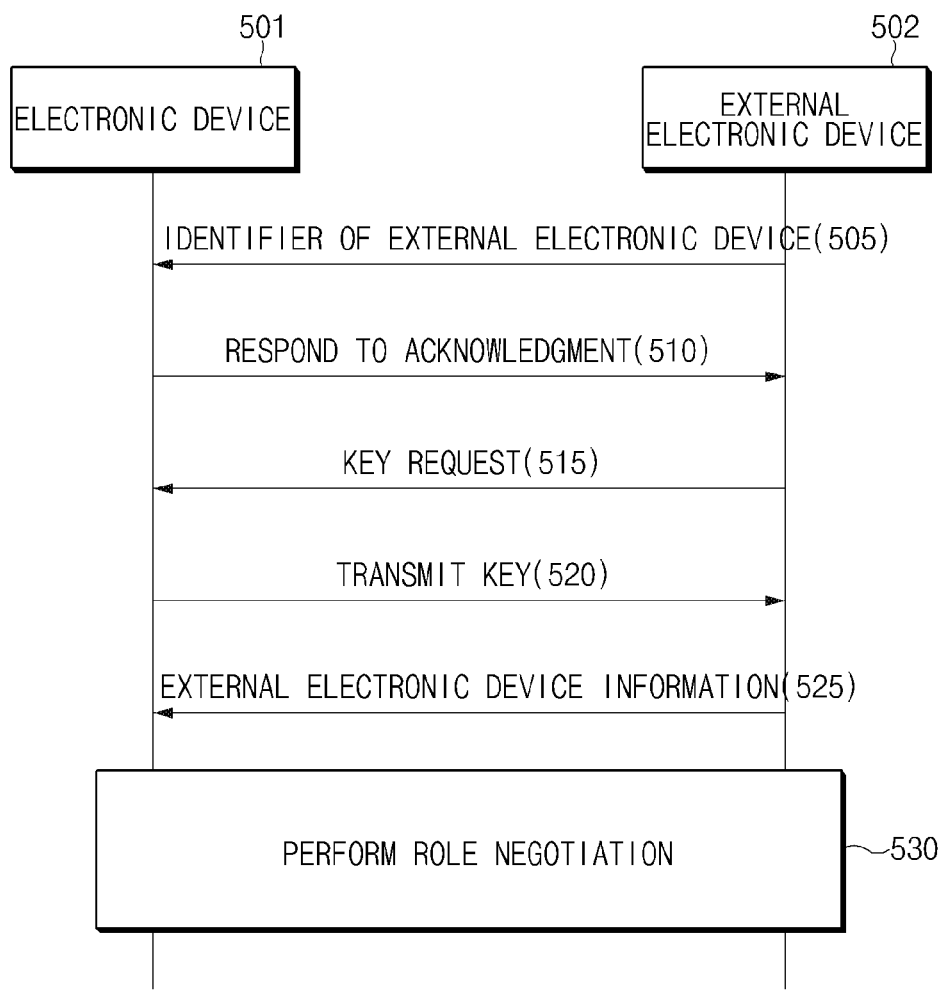
FIG. 5 is a flowchart of an initialization stage of a positioning method of an electronic device according to various embodiments.

FIG. 5 is a flowchart of an initialization stage of a positioning method of an electronic device according to various embodiments.

In operation 505, an external electronic device 502 (e.g., the electronic device 102 or the electronic device 104 in FIG. 1) may broadcast or advertise information including the identifier of the external electronic device 502. For example, the external electronic device 502 may perform operation 505 depending on the first wireless communication standard. For example, the first wireless communication standard may be one of Bluetooth (e.g., BLE), 3rd generation partnership project (3GPP) communication standard, institute of electrical and electronics engineers (IEEE) 802.15-based communication standard (e.g., ZigBee, ultra wideband (UWB), or the like), or Z-Wave communication standard.

According to an embodiment, an electronic device 501 (e.g., the electronic device 101 in FIG. 1) in the listen state may receive the identifier of the external electronic device 502, within the specified range from the external electronic device 502 (e.g., the first region 411 of FIG. 4). For example, the operating state of the electronic device 501 may be transitioned from an idle state to a listen state depending on a specified period. For another example, the operating state of the electronic device 501 may be transitioned from an idle state to a listening state based on an external signal.

In operation 510, the electronic device 501 may transmit an acknowledgment corresponding to the reception of the identifier of the external electronic device 502 to the external electronic device 502. For example, the electronic device 501 may perform operation 510 depending on the first wireless communication standard.

According to an embodiment, the first wireless communication according to the first wireless communication standard may be established between the electronic device 501 and the external electronic device 502 based on the transmission of the acknowledgment of the electronic device 501. According to another embodiment, to establish the first wireless communication, the electronic device 501 and the external electronic device 502 may transmit and receive other pieces of information not illustrated in FIG. 5.

In operation 515, the external electronic device 502 may transmit a key request for the authentication of the electronic device 501. For example, the external electronic device 502 may transmit a key request through the established first wireless communication.

In operation 520, the electronic device 501 may transmit the key to the external electronic device 502 in response to the key request. For example, the electronic device 501 may transmit the key through the first wireless communication. According to an embodiment, the electronic device 501 may transmit the key stored in a security region (e.g., SE or eSE) inside the electronic device 501.

According to an embodiment, the external electronic device 502 may attempt to authenticate the electronic device 501, using the key received from the electronic device 501. For example, the key may be a key used to authenticate the electronic device 501 in advance. For another example, the key may be encrypted by using a predefined value between the electronic device 501 and the external electronic device 502.

In operation 525, the external electronic device 502 may transmit external electronic device information to the electronic device 501. For example, the external electronic device information may include the positioning capability information of the external electronic device 502 (e.g., an application identifier, a positioning algorithm, a positioning role, a positioning master, a wireless state, and/or the number of antennas). For example, the external electronic device 502 may transmit the external electronic device information through the first wireless communication.

In operation 530, the electronic device 501 and the external electronic device 502 may perform role negotiation for positioning. According to an embodiment, the positioning capability information of the electronic device 501 and the positioning capability information of the external electronic device 502 may be exchanged with each other in operation 530. For example, the electronic device 501 or the external electronic device 502 may determine the positioning master based at least on the exchanged positioning capability information. According to another embodiment, in operation 530, the electronic device 501 or the electronic device 502 may determine a role and/or a positioning algorithm for positioning. A method of determining a role and/or algorithm may be referenced by the description associated with FIG. 4.

According to an embodiment, operation 530 may include the transmission of information about the result of the negotiation. For example, when the role and/or algorithm is determined by the electronic device 501, the electronic device 501 may transmit the result of the determination to the external electronic device 502. For another example, when the role and/or algorithm is determined by the external electronic device 502, the external electronic device 502 may transmit the result of the determination to the electronic device 501.

According to an embodiment, operation 530 may be performed through ultra-wideband communication. For example, operation 530 may include the initialization of ultra-wideband communication. In operation 530, the electronic device 501 and the external electronic device 502 may enable ultra-wideband communication.

The procedures illustrated in FIG. 5 are exemplary, and some operations may be omitted. According to an embodiment, the external electronic device 502 may authenticate or allow the electronic device 501 based on the address (e.g., a Bluetooth address) of the electronic device 501. In this case, operation 515 and operation 520 may be omitted. According to another embodiment, the external electronic device information may be transmitted at a role negotiation stage (operation 530). In this case, operation 525 may be omitted. For example, the initialization stage of FIG. 5 may be composed of device discovery (operation 505 and operation 510) according to the first wireless communication standard and a role negotiation stage (operation 530) for ultra-wideband signal-based positioning. In addition, in the embodiment of FIG. 5, the Bluetooth communication standard may be used as the first wireless communication standard. For another example, the first wireless communication standard may be ultra-wideband communication. In this case, the initialization operation of ultra-wideband communication between the electronic device 501 and the external electronic device 502 may be performed before operation 530.

According to an embodiment, after operation 530, the electronic device 501 and the external electronic device 502 may operate in a positioning mode. For example, the electronic device 501 and the external electronic device 502 may perform positioning based on the positioning master and/or algorithm determined in operation 530. Hereinafter, the positioning method will be described with reference to FIGS. 6, 7, and 8.

Figure 6:
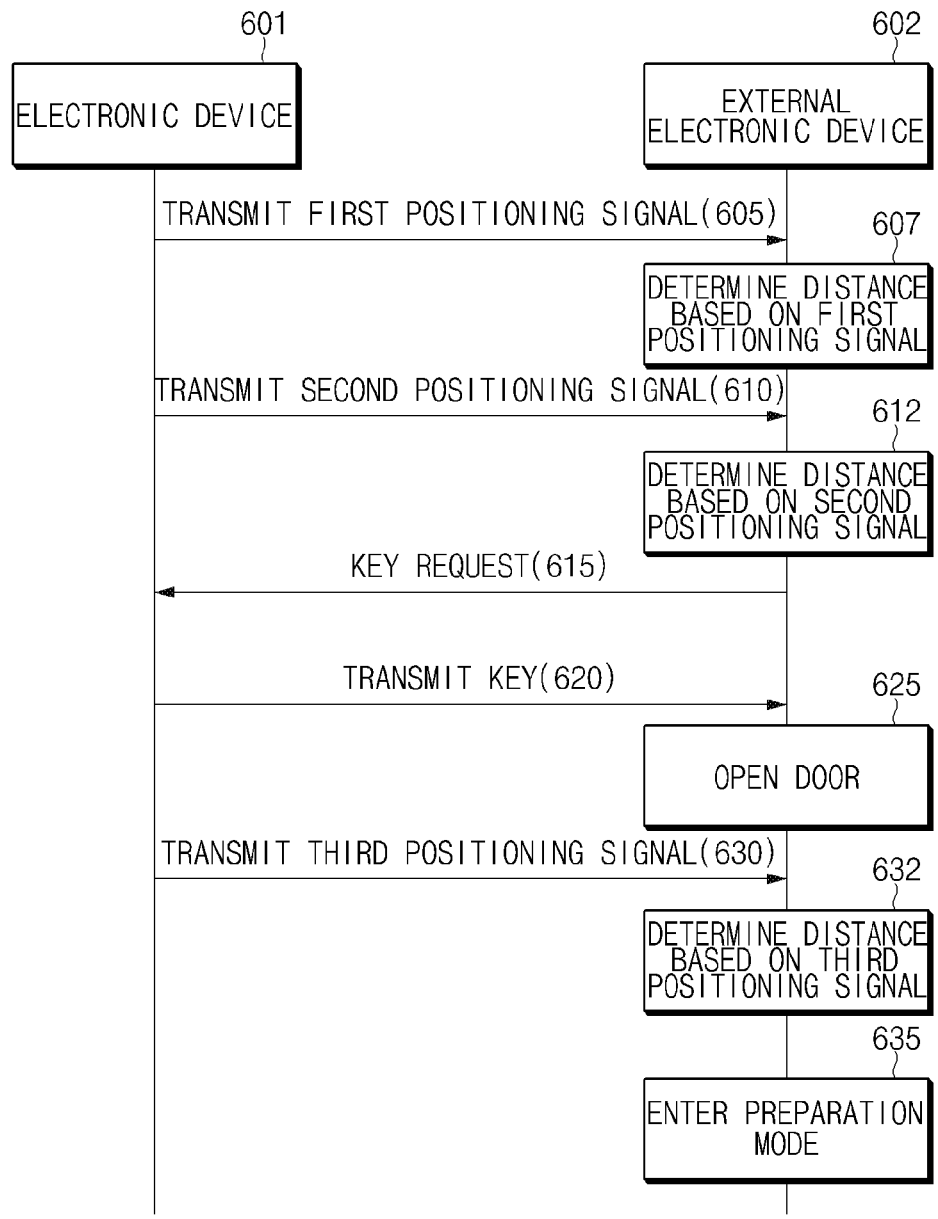
FIG. 6 is a flowchart of a positioning method according to an embodiment.

FIG. 6 is a flowchart of a positioning method according to an embodiment.

In the embodiment of FIG. 6, it is assumed that an external electronic device 602 (e.g., the electronic device 102 or the electronic device 104 of FIG. 1) is a vehicle. In addition, the external electronic device 602 may perform positioning using a TDoA algorithm as a positioning master. In addition, the external electronic device 602 may operate as an anchor for receiving a positioning signal, and an electronic device 601 (e.g., the electronic device 101 in FIG. 1) may operate as a tag for transmitting a positioning signal. The operations of FIG. 6 may be performed following operation 530 of FIG. 5.

In operation 605, the electronic device 601 may transmit a first positioning signal to the external electronic device 602. For example, the first positioning signal may be an ultra-wideband signal including transmission time information (e.g., a time stamp).

In operation 607, the external electronic device 602 may determine a distance between the external electronic device 602 and the electronic device 601 based at least on the first positioning signal. According to an embodiment, the external electronic device 602 may measure the distance between the electronic device 601 and the external electronic device 602 based at least on the transmission time information of the first positioning signal and the reception time of the first positioning signal. In operation 607, the external electronic device 602 may determine that the electronic device 601 has not entered the specified region (e.g., the third region 413 in FIG. 4), based at least on the first positioning signal. It is assumed that the electronic device 601 has not entered the specified region in operation 607. However, when it is determined that the electronic device 601 has entered the specified region, the external electronic device 602 may transmit a key request in operation 615. In this case, operation 610 and operation 612 may be omitted.

In operation 610, the electronic device 601 may transmit a second positioning signal to the external electronic device 602. For example, the second positioning signal may be an ultra-wideband signal including transmission time information (e.g., a time stamp). According to an embodiment, the electronic device 601 may transmit the second positioning signal at a specified period. For example, the specified period may be determined at a negotiation stage (e.g., operation 530 of FIG. 5). For another example, the specified period may be a preset value. According to an embodiment, until a response signal (e.g., the key request) is received from the external electronic device 602, the electronic device 601 may transmit a positioning signal at a specified period.

In operation 612, the external electronic device 602 may determine a distance between the external electronic device 602 and the electronic device 601 based at least on the second positioning signal. According to an embodiment, the external electronic device 602 may measure the distance between the electronic device 601 and the external electronic device 602 based at least on the transmission time information of the second positioning signal and the reception time of the second positioning signal. In operation 612, the external electronic device 602 may determine that the electronic device 601 is positioned in the specified region (e.g., the third region 413 in FIG. 4), based at least on the second positioning signal. It is assumed that the electronic device 601 has entered the specified region in operation 612. However, when it is determined that the electronic device 601 has not entered the specified region, the external electronic device 602 may transmit an additional positioning signal. For example, until it is determined that the electronic device 601 has entered the specified region, the external electronic device 602 may transmit a positioning signal at a specified period.

In operation 615, the external electronic device 602 may transmit a key request for the authentication of the electronic device 601. According to an embodiment, when it is determined, in operation 612, that the electronic device 601 is positioned in the specified region (e.g., the third region 413 in FIG. 4), the external electronic device 602 may transmit a key request to the electronic device 601. For example, the external electronic device 602 may transmit a key request through the established first wireless communication (e.g., BLE communication).

In operation 620, the electronic device 601 may transmit the key to the external electronic device 602 in response to the key request. For example, the electronic device 601 may transmit the key through the first wireless communication. According to an embodiment, the electronic device 601 may transmit the key stored in a security area (e.g., SE (secure element) or eSE (embedded SE)) inside the electronic device 601.

According to an embodiment, the external electronic device 602 may attempt to authenticate the electronic device 601, using the key received from the electronic device 601. For example, the key may be a key used to authenticate the electronic device 601 in advance. For another example, the key may be encrypted by using a predefined value between the electronic device 601 and the external electronic device 602.

In operation 625, the external electronic device 602 may open the door of the external electronic device 602 when the electronic device 601 is positioned within a specified distance (e.g., the third region 413 in FIG. 4) and authentication of the electronic device 601 is successful.

In operation 630, the electronic device 601 may transmit a third positioning signal to the external electronic device 602. For example, the third positioning signal may be an ultra-wideband signal including transmission time information (e.g., a time stamp). According to an embodiment, the electronic device 601 may transmit the third positioning signal at a specified period. According to another embodiment, to transmit a key successfully, the electronic device 601 may transmit the third positioning signal after the key is transmitted (in operation 630).

In operation 632, the external electronic device 602 may determine a distance between the external electronic device 602 and the electronic device 601 based at least on the third positioning signal. According to an embodiment, the external electronic device 602 may measure the distance between the electronic device 601 and the external electronic device 602 based at least on the transmission time information of the third positioning signal and the reception time of the third positioning signal. In operation 632, the external electronic device 602 may determine that the electronic device 601 is positioned in the specified region (e.g., the interior of the external electronic device 602), based at least on the third positioning signal. It is assumed that the electronic device 601 has entered the specified region in operation 632. However, when it is determined that the electronic device 601 has not entered the specified region, the external electronic device 602 may transmit an additional positioning signal.

In operation 635, the external electronic device 602 may enter a preparation mode when the electronic device 601 is positioned in a specified region (e.g., the interior of the vehicle). According to an embodiment, the external electronic device 602 may determine that the electronic device 601 is positioned inside the external electronic device 602, based on the third positioning signal.

In the embodiment of FIG. 6, operation 625 and operation 635 are exemplary, and the external electronic device 602 may perform various operations based at least on the distance of the electronic device 602 and whether the electronic device 602 is authenticated.

Figure 7:
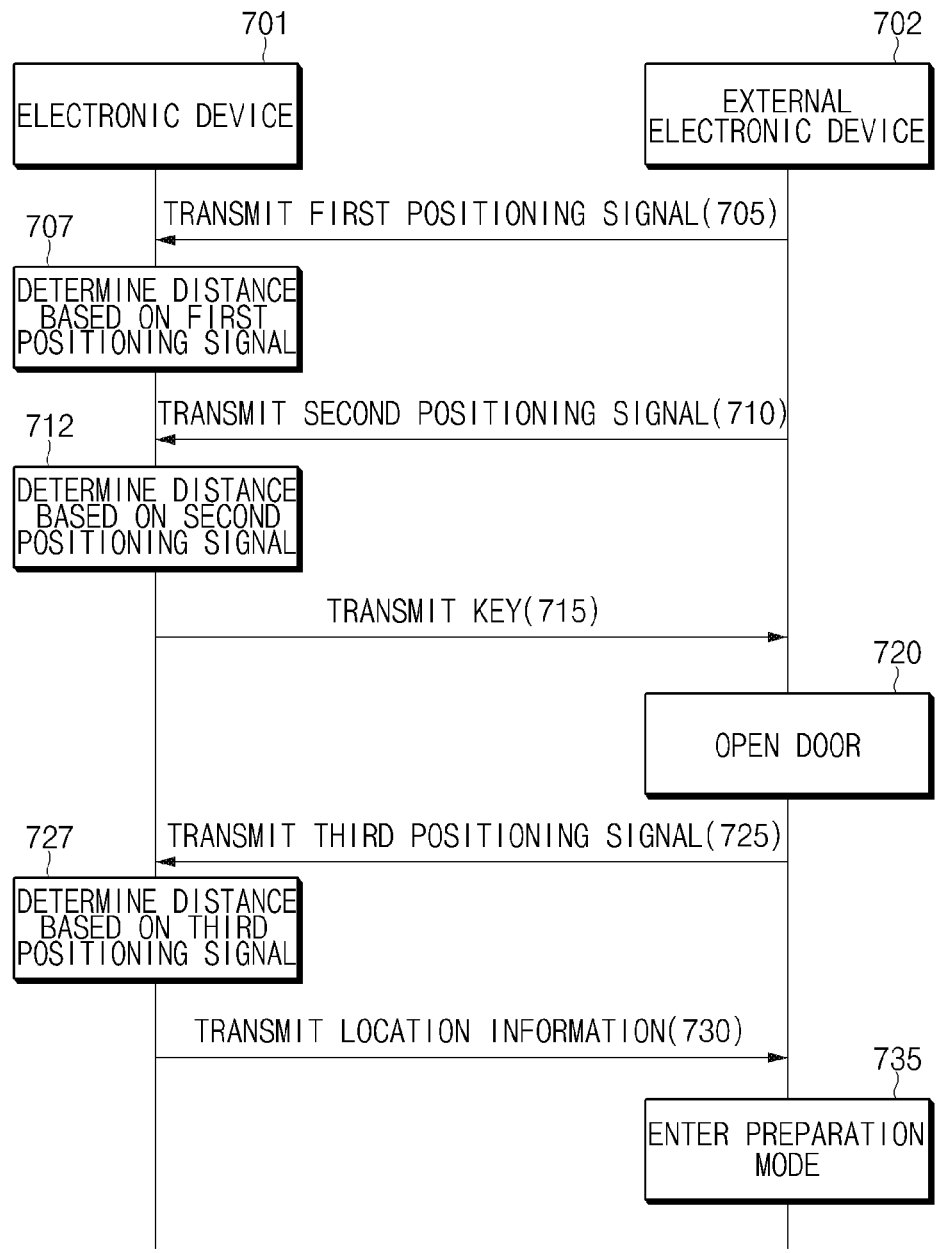
FIG. 7 is a flowchart of a positioning method according to another embodiment.

FIG. 7 is a flowchart of a positioning method according to another embodiment.

In the embodiment of FIG. 7, it is assumed that an external electronic device 702 (e.g., the electronic device 102 or the electronic device 104 of FIG. 1) is a vehicle. In addition, an electronic device 701 (e.g., the electronic device 101 in FIG. 1) may perform positioning using an AoA algorithm as a positioning master. Furthermore, the electronic device 701 may operate as an anchor for receiving a positioning signal, and the external electronic device 702 may operate as a tag for transmitting a positioning signal. The operations of FIG. 7 may be performed following operation 530 of FIG. 5.

In operation 705, the external electronic device 702 may transmit a first positioning signal to the electronic device 701. For example, the first positioning signal may be an ultra-wideband signal. According to an embodiment, the external electronic device 702 may transmit the first positioning signal according to the specified transmission power. According to another embodiment, the external electronic device 702 may transmit the first positioning signal including information about the transmission power.

In operation 707, the electronic device 701 may determine a distance between the external electronic device 702 and the electronic device 701 based at least on the first positioning signal. According to an embodiment, the electronic device 701 may receive the first positioning signal through a plurality of antennas, and may determine AoA of the first positioning signal based at least on the phase difference of signals received through the plurality of antennas. Moreover, according to an embodiment, the electronic device 701 may measure the distance between the electronic device 701 and the external electronic device 702 based at least on the transmission power of the first positioning signal and the reception power of the first positioning signal. In operation 707, the electronic device 701 may determine that the electronic device 701 has not entered the specified region (e.g., the third region 413 in FIG. 4), based at least on the first positioning signal. It is assumed that the electronic device 701 has not entered the specified region in operation 707. However, when it is determined that the electronic device 701 enters the specified region, the electronic device 701 may transmit a key request in operation 715. In this case, operation 710 and operation 712 may be omitted.

In operation 710, the external electronic device 702 may transmit a second positioning signal to the electronic device 701. According to an embodiment, the external electronic device 702 may transmit the second positioning signal at a specified period. For example, the specified period may be determined at a negotiation stage (e.g., operation 530 of FIG. 5). For another example, the specified period may be a preset value. According to an embodiment, until a response signal (e.g., a key) is received from the electronic device 701, the external electronic device 702 may transmit a positioning signal at a specified period.

In operation 712, the electronic device 701 may determine a distance between the external electronic device 702 and the electronic device 701 based at least on the second positioning signal. The determination of the distance may be performed depending on the descriptions given with regard to operation 707. In operation 712, the electronic device 701 may determine that the electronic device 701 is positioned in the specified region (e.g., the third region 413 in FIG. 4), based at least on the second positioning signal. It is assumed that the electronic device 701 has entered the specified region in operation 712. However, when it is determined that the electronic device 701 has not entered the specified region, the electronic device 701 may receive an additional positioning signal.

In operation 715, the electronic device 701 may transmit a key to the external electronic device 702 based on the distance from the external electronic device 702. According to an embodiment, when it is determined, in operation 712, that the electronic device 701 is positioned in the specified region (e.g., the third region 413 in FIG. 4), the electronic device 701 may transmit a key to the external electronic device 702. For example, the electronic device 701 may transmit the key through the first wireless communication (e.g., BLE). According to an embodiment, the electronic device 701 may transmit the key stored in a security area (e.g., SE or eSE) inside the electronic device 701.

According to an embodiment, the external electronic device 702 may attempt to authenticate the electronic device 701, using the key received from the electronic device 701. For example, the key may be a key used to authenticate the electronic device 701 in advance. For another example, the key may be encrypted by using a predefined value between the electronic device 701 and the external electronic device 702.

In operation 720, the external electronic device 702 may open the door of the external electronic device 702 when the electronic device 701 is positioned within a specified distance (e.g., the third region 413 in FIG. 4) and authentication of the electronic device 701 is successful.

In operation 725, the external electronic device 702 may transmit a third positioning signal to the electronic device 701. For example, the third positioning signal may be an ultra-wideband signal. According to an embodiment, the external electronic device 702 may transmit the third positioning signal at a specified period. According to another embodiment, to receive the key successfully, the external electronic device 702 may transmit the third positioning signal after the key is received (in operation 715).

In operation 727, the electronic device 701 may determine a distance between the external electronic device 702 and the electronic device 701 based at least on the third positioning signal. According to an embodiment, the electronic device 701 may receive the third positioning signal through a plurality of antennas, and may determine AoA of the third positioning signal based at least on the phase difference of signals received through the plurality of antennas. Moreover, according to an embodiment, the electronic device 701 may measure the distance between the electronic device 701 and the external electronic device 702 based at least on the transmission power of the first positioning signal and the reception power of the first positioning signal. In operation 727, the electronic device 701 may determine that the electronic device 701 is positioned in the specified region (e.g., the interior of the external electronic device 702), based at least on the third positioning signal. It is assumed that the electronic device 701 has entered the specified region in operation 727. However, when it is determined that the electronic device 701 has not entered the specified region, the electronic device 701 may receive an additional positioning signal.

In operation 730, the electronic device 701 may transmit location information indicating that the electronic device 701 is located in a specified region, to the external electronic device 702 depending on the result of operation 727 (e.g., when the electronic device 701 determines that the electronic device 701 has entered the specified region (e.g., the interior of the vehicle)). For example, in operation 727, the electronic device 701 may detect that the electronic device 701 enters a vehicle (e.g., the external electronic device 702), based at least on the third positioning signal. In this case, the electronic device 701 may transmit location information of the electronic device 701 to the external electronic device 702. For example, the electronic device 701 may transmit location information through the first wireless communication.

In operation 735, the external electronic device 702 may enter a preparation mode when the location information of the electronic device 701 is received.

Figure 8:
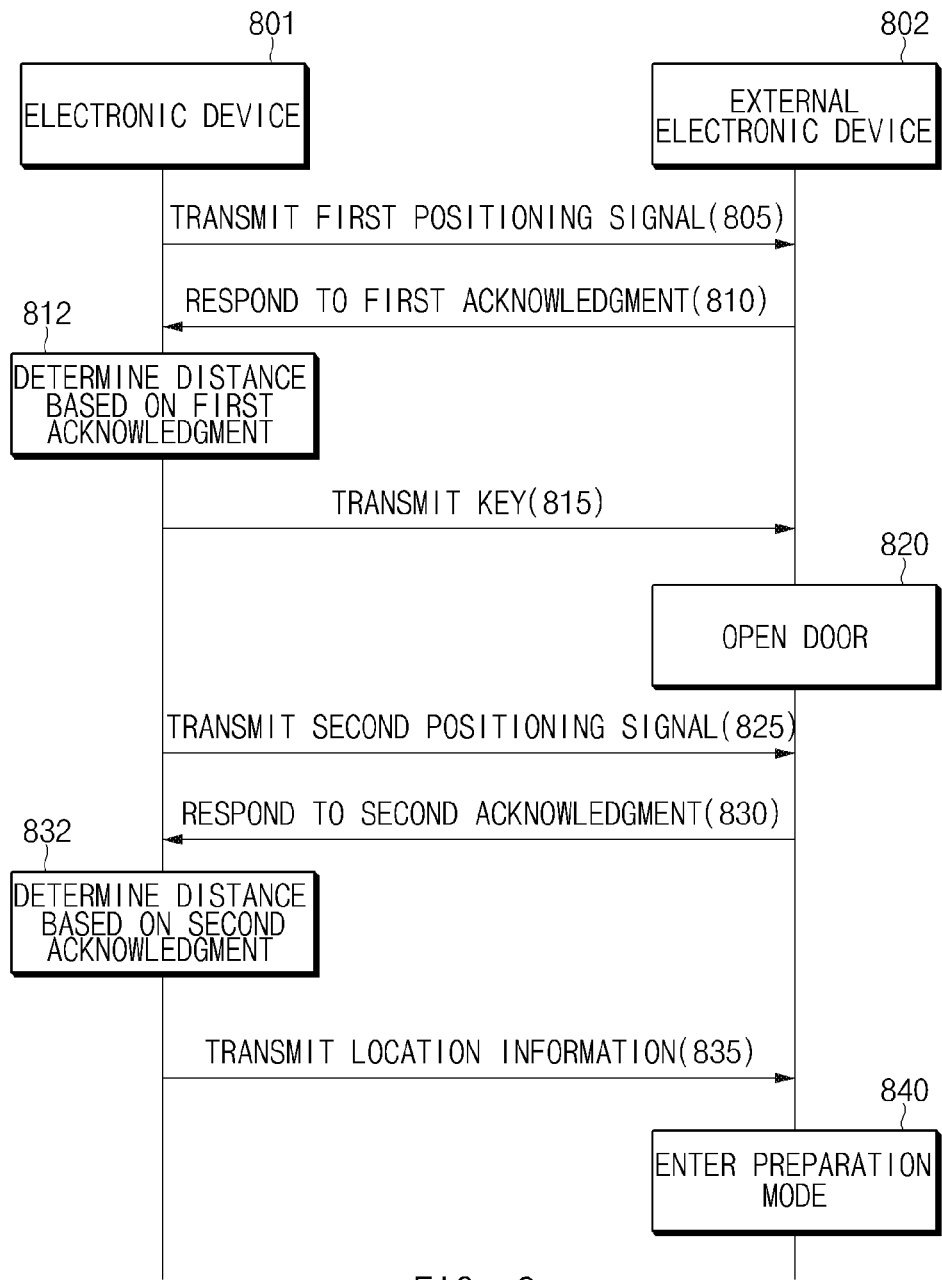
FIG. 8 is a flowchart of a positioning method according to still another embodiment.

FIG. 8 is a flowchart of a positioning method according to still another embodiment.

In the embodiment of FIG. 8, it is assumed that an external electronic device 802 (e.g., the electronic device 102 or the electronic device 104 of FIG. 1) is a vehicle. In addition, an electronic device 801 (e.g., the electronic device 101 in FIG. 1) may perform positioning using a TWR algorithm as a positioning master. Furthermore, the electronic device 801 may operate as a tag for transmitting a positioning signal, and the external electronic device 802 may operate as an anchor for receiving a positioning signal. The operations of FIG. 8 may be performed following operation 530 of FIG. 5. In the embodiment of FIG. 8, the description associated with operation 815, operation 820, operation 835, and operation 840 may be referenced by the description associated with operation 715, operation 720, operation 730, and operation 735 of FIG. 7. Thus, additional description will be omitted to avoid redundancy. Hereinafter, the embodiment of FIG. 8 will be described focusing on the difference from the positioning method of FIG. 7.

In operation 805, the electronic device 801 may transmit a first positioning signal to the external electronic device 802. For example, the first positioning signal may be an ultra-wideband signal. For another example, the first positioning signal may be an ultra-wideband signal including transmission time information (e.g., a time stamp). In FIG. 8, the transmission 805 of the first positioning signal is not limited to once. For example, until the first acknowledgment is received or it is determined, based on the first acknowledgment, that the electronic device 801 enters the specified region, the electronic device 801 may periodically transmit the first positioning signal.

In operation 810, the external electronic device 802 may transmit a first acknowledgment to the electronic device 801 in response to the first positioning signal. For example, the external electronic device 802 may transmit the first acknowledgment through the first wireless communication (e.g., BLE). For another example, the first acknowledgment may include information about the transmission time of the first acknowledgment of the external electronic device 802.

In operation 812, the electronic device 801 may determine a distance between the electronic device 801 and the external electronic device 802 based at least on the first acknowledgment. According to an embodiment, the electronic device 801 may measure the distance between the electronic device 801 and the external electronic device 802 based at least on the transmission time of the first positioning signal and the reception time of the first acknowledgment. Also, when it is determined that the external electronic device 802 is within the specified distance, the electronic device 801 may perform operation 815. In operation 812, the electronic device 801 may transmit an additional positioning signal when it is determined that the electronic device 801 is outside the specified distance from the external electronic device 802.

The description of operation 825 and operation 830 may be referenced by the description of operation 805 and operation 810. In operation 832, the electronic device 801 may determine a distance between the electronic device 801 and the external electronic device 802 based at least on a second acknowledgment. In an embodiment, the electronic device 801 may determine that the electronic device 801 is positioned in a specified region (e.g., the interior of the external electronic device 802), based at least on the second acknowledgment. In this case, the electronic device 801 may perform operation 835. The description of operation 835 may be referenced by the description of operation 730 of FIG. 7. The external electronic device 802 may enter a preparation mode in operation 840, in response to receiving location information in operation 835. The description of operation 840 may be referenced by the description of operation 735 of FIG. 7. For convenience of description, it is assumed that the electronic device 801 enters the specified region in operation 832. However, when it is determined, in operation 832, that the electronic device 801 is not positioned in the specified region, the electronic device 801 may additionally perform operation 825, operation 830, and operation 832.

Figure 9:
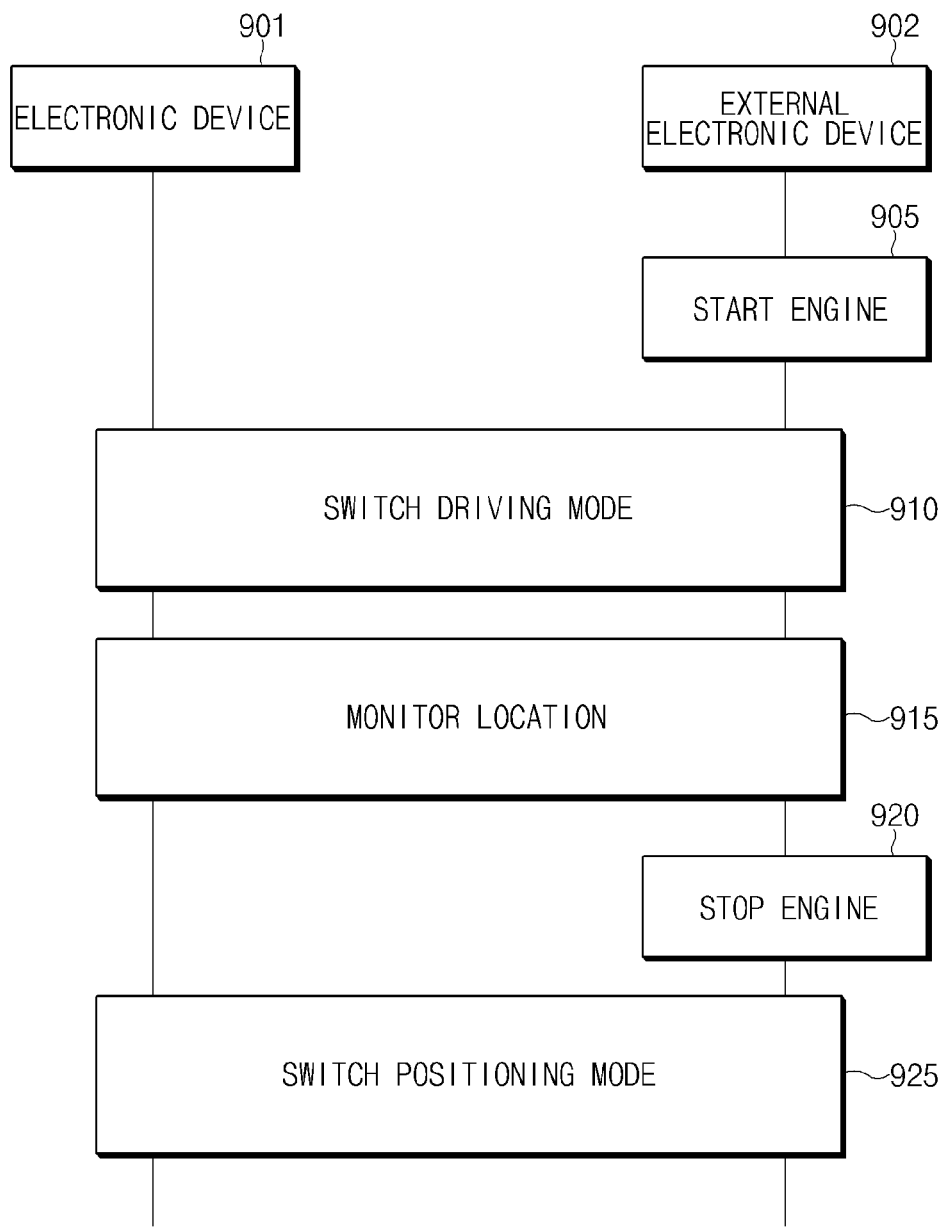
FIG. 9 is a flowchart illustrating an electronic device control method, according to various embodiments.

FIG. 9 is a flowchart illustrating an electronic device control method, according to various embodiments.

In the embodiment of FIG. 9, it is assumed that an external electronic device 902 (e.g., the electronic device 102 or the electronic device 104 of FIG. 1) is a vehicle. Besides, it is assumed that an electronic device 901 (e.g., the electronic device 101 in FIG. 1) is positioned inside the vehicle. For example, the operations of FIG. 9 may be performed after the preparation mode of FIGS. 6, 7, and 8.

In operation 905, the engine of the external electronic device 902 is started. After the engine is started, in operation 910, the operating states of the electronic device 901 and the external electronic device 902 may be switched to a driving mode. According to an embodiment, the external electronic device 902 may transmit a signal indicating the switch to the driving mode to the electronic device 901 through first wireless communication (e.g., BLE).

According to an embodiment, the signal indicating the switch to the driving mode may include information associated with a positioning algorithm. For example, the signal indicating the switch to the driving mode may include information about a positioning algorithm (e.g., AoA, TDoA, TWR, AoD, ToA, or ToF) and/or a positioning period to be used in the driving mode.

According to an embodiment, the electronic device 901 may transmit an acknowledgment to the external electronic device 902 in response to the signal indicating the switch to the driving mode. For example, the electronic device 901 may transmit the acknowledgment to the external electronic device 902 through the first wireless communication.

In operation 915, location monitoring for the electronic device 901 may be performed by the external electronic device 902.

According to an embodiment, the location monitoring in the driving mode may be set independently of the positioning method before operation 905. For example, in the driving mode, the external electronic device 902 may operate as a positioning master. Even though the electronic device 901 has operated as a positioning master before operation 905, the external electronic device 902 may operate as the positioning master in the driving mode. For another example, the positioning algorithm in the driving mode may be different from that of operation 905.

According to another embodiment, after the switching to the driving mode, the location monitoring may be omitted. For example, it may be assumed that the electronic device 901 is positioned inside the external electronic device 902 until the engine of the external electronic device 902 is stopped.

In operation 920, the engine of the external electronic device 902 is stopped. In this case, in operation 925, the operating states of the electronic device 901 and the external electronic device 902 may be switched to a positioning mode. For example, when the engine is stopped, the external electronic device 902 may transmit a signal indicating the switch to a positioning mode, to the electronic device 901 through the first wireless communication.

According to an embodiment, after the switching to the positioning mode, the electronic device 901 and the external electronic device 902 may perform positioning depending on the agreed method in an initialization stage (e.g., the initialization stage in FIG. 5). Furthermore, the electronic device 901 and the external electronic device 902 may perform various operations based on a distance. For example, when the electronic device 901 leaves the specified region, the external electronic device 902 may lock the door of the external electronic device 902.

Referring to FIG. 9, the exemplary operations of the electronic device 901 and the external electronic device 902 are described. Hereinafter, the exemplary antenna configurations of the electronic device 901 and the external electronic device 902 are described with reference to FIG. 10.

Figure 10:
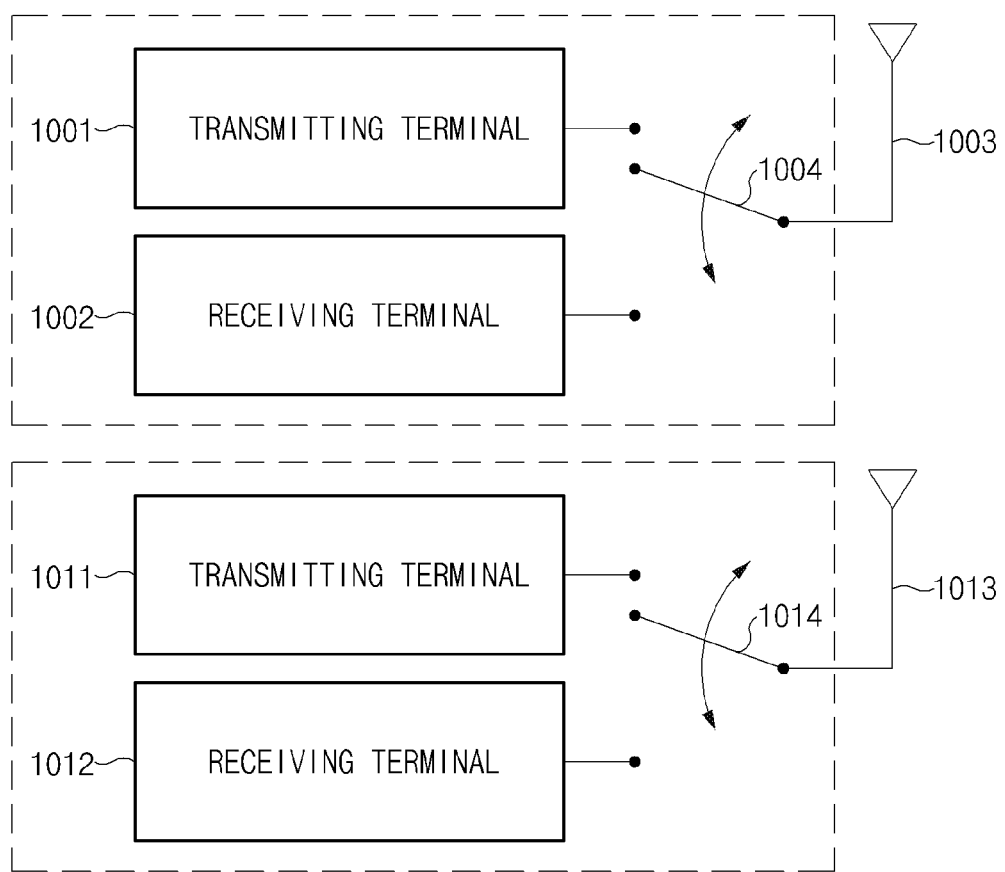
FIG. 10 is a diagram of an antenna configuration according to an embodiment.

FIG. 10 is a diagram of an antenna configuration according to an embodiment.

In the embodiment of FIG. 10, a first antenna 1003 and a second antenna 1013 illustrate an exemplary structure of an antenna module (e.g., the antenna module 197 of FIG. 1) of an electronic device (e.g., the electronic device 101 of FIG. 1). Moreover, transmitting terminals 1001 and 1011 and receiving terminals 1002 and 1012 may be included in a communication module (e.g., the communication module 190 of FIG. 1) of the electronic device. According to an embodiment, the external electronic device (e.g., the electronic device 102 or the electronic device 104 in FIG. 1) may also include an antenna configuration similar to the antenna configuration in FIG. 10.

According to an embodiment, each of the transmitting terminals 1001 and 1011 may include a pulse generator, a modulator, and an amplifier. In addition, each of the receiving terminals 1002 and 1012 may include a correlator, a filter, and a low noise amplifier.

According to an embodiment, each of the antennas 1003 and 1013 is selectively connected to the transmitting terminals 1001 and 1011 or the receiving terminals 1002 and 1012 through switches 1004 and 1014 to perform various positioning algorithms to be described later.

According to an embodiment, the electronic device may perform positioning based on the AoA algorithm. In this case, the electronic device may perform positioning based on the AoA and intensity of the received signal. For example, the electronic device may receive signals through two antennas 1003 and 1013, by connecting the first antenna 1003 to the receiving terminal 1002 using the switch 1004 and connecting the second antenna 1013 to the receiving terminal 1012 using the switch 1014. The electronic device may perform positioning by comparing the phase and magnitude of signals received through the two antennas 1003 and 1013.

According to an embodiment, the electronic device may perform positioning based on AoD. For example, the electronic device may transmit a plurality of isolated signals to the reception electronic device. The reception electronic device may calculate the location of the electronic device, using the isolated signals. In this case, the electronic device may transmit signals through the two antennas 1003 and 1013, by connecting the first antenna 1003 to the transmitting terminal 1001 using the switch 1004 and connecting the second antenna 1013 to the transmitting terminal 1011 using the switch 1014.

According to an embodiment, the electronic device may perform positioning based on ToF. In this case, when transmitting a positioning signal, the electronic device may connect the first antenna 1003 to the transmitting terminal 1001 by using the switch 1004 and may connect the second antenna 1013 to the transmitting terminal 1011 by using the switch 1014. Also, to receive a response signal, the electronic device may connect the first antenna 1003 to the receiving terminal 1002 by using the switch 1004 and may connect the second antenna 1013 to the receiving terminal 1012 by using the switch 1014.

According to an embodiment, the electronic device may perform positioning based on an algorithm such as ToA or TDoA. For example, the electronic device may transmit a signal including time information (e.g., a time stamp). In this case, the electronic device may transmit signals through the two antennas 1003 and 1013, by connecting the first antenna 1003 to the transmitting terminal 1001 using the switch 1004 and connecting the second antenna 1013 to the transmitting terminal 1011 using the switch 1014.

In the above-described various embodiments, the antennas 1003 and 1013 may be connected to the corresponding transmitting terminals 1001 and 1011 or the corresponding receiving terminals 1002 and 1012 based on the positioning algorithm, respectively. According to an embodiment, the antenna structure of FIG. 10 may be used as radar. For example, the first antenna 1003 may be connected to the transmitting terminal 1001 and may be used to transmit an ultra-wideband signal. In this case, the second antenna 1013 may be connected to the receiving terminal 1012 and may receive a reverberation obtained by reflecting the transmitted ultra-wideband signal from an object.

In the embodiment of FIG. 10, the two antennas 1003 and 1013 are illustrated, but the antenna configuration of the electronic device and the external electronic device is not limited thereto. For example, an electronic device and/or an external electronic device may include a plurality of two or more antennas. For another example, the electronic device and/or the external electronic device may include only one antenna.

Figure 11:
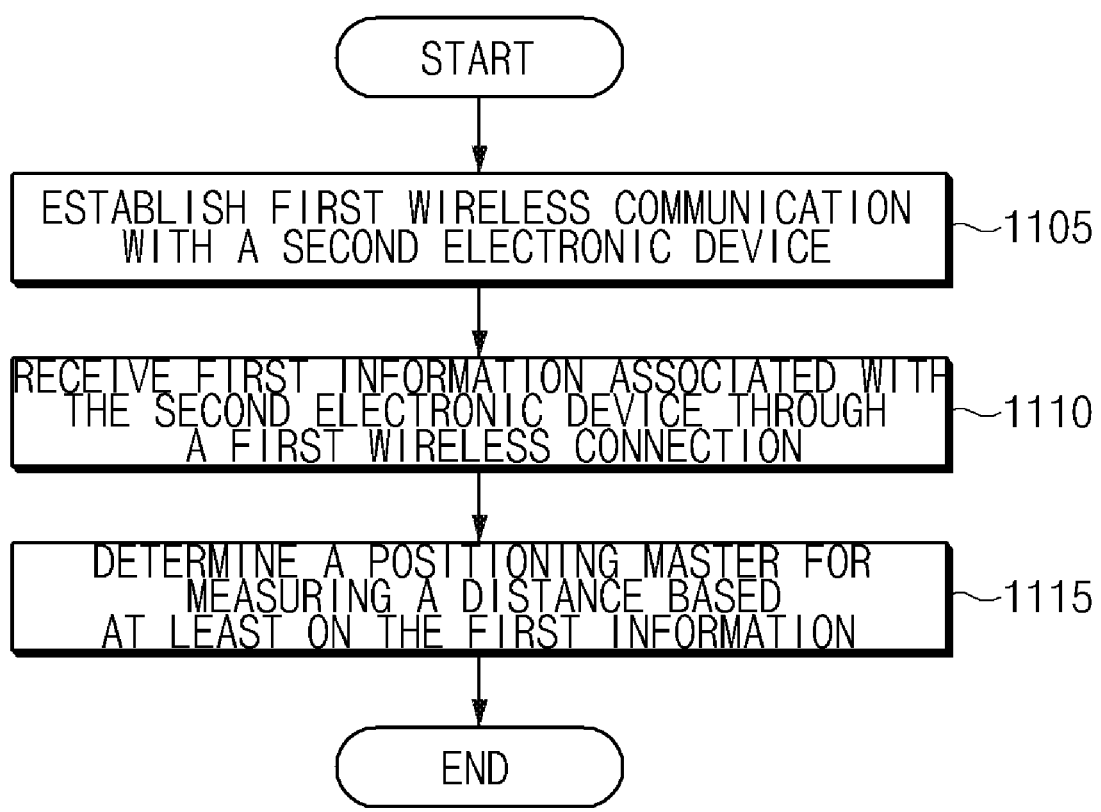
FIG. 11 is a flowchart of a positioning method of an electronic device according to various embodiments.

FIG. 11 is a flowchart of a positioning method of an electronic device according to various embodiments.

In the embodiment of FIG. 11, each of operations may be performed by a first electronic device (e.g., the electronic device 101 of FIG. 1). For example, the first electronic device may be the electronic device described above with reference to FIGS. 2 to 10. Hereinafter, the operations of the first electronic device may be performed by a processor (e.g., the processor 120 of FIG. 1) included in the first electronic device. Furthermore, the first electronic device may perform communication (e.g., the transmission and/or reception of a signal), using at least one communication circuit (e.g., the communication module 190 of FIG. 1).

In operation 1105, the first electronic device (e.g., the processor 120 in FIG. 1) may establish first wireless communication with a second electronic device (e.g., the electronic device 102 or the electronic device 104 in FIG. 1) depending on the first wireless communication standard (e.g., Bluetooth communication standard, ultra-wideband communication standard, or Wi-Fi communication standard), using at least one communication circuit (e.g., the communication module 190 in FIG. 1).

In operation 1110, the first electronic device (e.g., the processor 120 of FIG. 1) may receive first information associated with the second electronic device through a first wireless connection. For example, the first information may at least include an application identifier of the second electronic device. For another example, the first information may include at least one of the application identifier of the second electronic device, information about a positioning algorithm, a support role, positioning master information, a transmission/reception state, or the number of antennas.

In operation 1115, the first electronic device (e.g., the processor 120 of FIG. 1) may determine a positioning master for measuring a distance among the first electronic device and the second electronic device based at least on the first information. For another example, the first electronic device may determine the positioning master and positioning algorithm. According to an embodiment, the first electronic device may transmit information about the determined positioning master and/or positioning algorithm to the second electronic device.

The embodiment of FIG. 11 may be referenced by the operations described above with respect to FIG. 5. For example, the first electronic device (e.g., the processor 120 of FIG. 1) may receive the identifier of the second electronic device and may transmit an acknowledgment for the identifier of the second electronic device. For another example, the first electronic device may establish a first wireless connection by receiving a key request from the second electronic device and transmitting a key to the second electronic device.

According to an embodiment, the first electronic device may perform positioning based on at least one of the AoA, AoD, time stamp, or ToF of an ultra-wideband signal.

According to an embodiment, when it is determined that the first electronic device is a positioning master, the first electronic device (e.g., the processor 120 in FIG. 1) may measure the distance between the first electronic device and the second electronic device based on a periodic ultra-wideband signal received from the second electronic device. When the second electronic device is positioned within a specified distance, the first electronic device may transmit a key to the second electronic device. For example, the key may be a key for authentication of the first electronic device. According to another embodiment, when it is determined that the second electronic device is a positioning master, the first electronic device may periodically transmit the ultra-wideband signal to the second electronic device.

The embodiment of FIG. 11 has been mainly described focusing on the first electronic device, but the operations of FIG. 11 may be performed by the second electronic device. For example, when the first electronic device is positioned within a specified distance, the second electronic device may transmit a key request to the first electronic device. Besides, the second electronic device may perform a specified operation based on the key received from the first electronic device.

The invention claimed is:

1. An electronic device comprising:
at least one communication circuit; and
a processor configured to:
communicate with an external electronic device based on a Bluetooth protocol, using the at least one communication circuit,
receive first information comprising type information of the external electronic device through a pre-symbol frame based on the Bluetooth protocol, using the at least one communication circuit, wherein the first information comprises an application identifier of an application executing on the external electronic device,
determine a positioning master for measuring a distance between the electronic device and the external electronic device based on a time-stamped ultra-wideband communication from a device operating as a positioning slave to a device operating as the positioning master, wherein the positioning master is determined according to an application type identified from the application identifier,
when the electronic device is determined as the positioning master, receive the time-stamped ultra-wideband communication from the external electronic device, and determine, by the positioning master the distance between the electronic device and the external electronic device based on the time-stamped ultra-wideband communication, and
when the electronic device is determined as the positioning slave, transmit the time-stamped ultra-wideband communication to the external electronic device, wherein the external electronic device is operating as the positioning master.

2. The electronic device of claim 1, wherein the first information further comprises at least one of information about a positioning algorithm, a support role, positioning master information, a transmission/reception state, or a number of antennas of the external electronic device.

3. The electronic device of claim 2, wherein the processor is configured to:
determine a positioning algorithm for measuring the distance between the electronic device and the external electronic device based at least on the first information.

4. The electronic device of claim 1, wherein the processor is configured to:
receive an identifier of the external electronic device from the external electronic device, using the at least one communication circuit,
transmit an acknowledgment for the identifier, using the at least one communication circuit,
receive a key request from the external electronic device, using the at least one communication circuit, and
establish communication with the external electronic device according to the Bluetooth protocol by transmitting a key to the external electronic device using the at least one communication circuit.

5. The electronic device of claim 1, wherein the processor is configured to:
measure the distance between the external electronic device and the electronic device based on at least one of strength of the time-stamped ultra-wideband communication, time information included in the time-stamped ultra-wideband communication, or time of flight of the time-stamped ultra-wideband communication.

6. The electronic device of claim 1, wherein the processor is configured to:
transmit information about the determined positioning master to the external electronic device, using an ultra-wideband signal.

7. The electronic device of claim 1, wherein the processor is configured to, when it is determined that the electronic device is the positioning master:
when the distance between the electronic device and the external electronic device is less than a specified distance, transmit information including a key to the external electronic device, using the Bluetooth protocol.

8. The electronic device of claim 1, wherein the processor is configured to:
when it is determined that the external electronic device is the positioning master, transmit the time-stamped ultra-wideband communication for measuring the distance between the electronic device and the external electronic device to the external electronic device at a specified period.

9. The electronic device of claim 8, wherein the processor is configured to:
when a key request based on transmission of the time-stamped ultra-wideband communication at the specified period is received from the external electronic device, transmit information including a key to the external electronic device, using the Bluetooth protocol.

10. An electronic device comprising:
at least one communication circuit; and
a processor configured to:
broadcast information including an identifier of the electronic device, using the at least one communication circuit,
receive, from an external electronic device, a response signal to broadcasting information including the identifier of the electronic device, using the at least one communication circuit,
communicate with the external electronic device according to a Bluetooth protocol based at least on the response signal,
receive first information at least including type information of the external electronic device through a pre-symbol frame according to the Bluetooth protocol, using the at least one communication circuit, wherein the first information comprises an application identifier of an application executing on the external electronic device,
determine a positioning master for measuring a distance between the electronic device and the external electronic device based on a time-stamped ultra-wideband communication from a device operating as a positioning slave to a device operating as a positioning master, wherein the positioning master is determined according to an application type identified from the application identifier,
when the electronic device is determined as the positioning master, receive the time-stamped ultra-wideband communication from the external electronic device, and determine, by the positioning master, the distance between the electronic device and the external electronic device based on the time-stamped ultra-wideband communication, and
when the electronic device is determined as the positioning slave, transmit the time-stamped ultra-wideband communication to the external electronic device, wherein the external electronic device is operating as the positioning master.

11. The electronic device of claim 10, wherein the first information further includes at least one of information about a positioning algorithm, a support role, positioning master information, a transmission/reception state, or a number of antennas of the external electronic device.

12. The electronic device of claim 11, wherein the processor is configured to:
   determine a positioning algorithm for measuring the distance between the electronic device and the external electronic device based at least on the first information.

13. The electronic device of claim 10, wherein the processor is configured to:
   measure the distance between the external electronic device and the electronic device based on at least one of strength of the time-stamped ultra-wideband communication, time information included in the time-stamped ultra-wideband communication, or time of flight of the time-stamped ultra-wideband communication.

* * * * *